(12) United States Patent
Goyette

(10) Patent No.: US 11,111,082 B2
(45) Date of Patent: Sep. 7, 2021

(54) PRODUCT DETECTOR

(71) Applicant: SIDEL CANADA INC., Québec (CA)

(72) Inventor: Stéphane Goyette, Québec (CA)

(73) Assignee: SIDEL CANADA, Laval (CA)

( * ) Notice: Subject to any disclaimer, the term of this patent is extended or adjusted under 35 U.S.C. 154(b) by 313 days.

(21) Appl. No.: 15/999,809

(22) PCT Filed: Feb. 19, 2016

(86) PCT No.: PCT/IB2016/000157
§ 371 (c)(1),
(2) Date: Aug. 20, 2018

(87) PCT Pub. No.: WO2017/141066
PCT Pub. Date: Aug. 24, 2017

(65) Prior Publication Data
US 2020/0283237 A1 Sep. 10, 2020

(51) Int. Cl.
| B65G 43/08 | (2006.01) |
| B33Y 80/00 | (2015.01) |
| G01F 3/00 | (2006.01) |
| G01F 1/30 | (2006.01) |
| G01F 13/00 | (2006.01) |

(52) U.S. Cl.
CPC ............. *B65G 43/08* (2013.01); *B33Y 80/00* (2014.12); *B65G 2203/043* (2013.01); *G01F 1/30* (2013.01); *G01F 3/00* (2013.01); *G01F 13/003* (2013.01)

(58) Field of Classification Search
CPC ...................................................... B65G 43/08
See application file for complete search history.

(56) References Cited

U.S. PATENT DOCUMENTS

| 5,755,074 A * | 5/1998 | Fetters ................ B65B 59/005 53/69 |
| 5,775,067 A * | 7/1998 | Hawley ................ B65B 21/06 53/543 |
| 6,237,427 B1 | 5/2001 | Helfrich et al. |
| 9,073,698 B2 | 7/2015 | Helfrich et al. |

FOREIGN PATENT DOCUMENTS

| DE | 3607858 A1 * | 9/1987 | ............. B65G 43/08 |
| DE | 102010000596 A1 | 9/2011 | |
| EP | 2 363 359 A1 | 9/2011 | |

OTHER PUBLICATIONS

International Search Report, dated Oct. 12, 2016, from corresponding PCT/IB2016/000157 application.

* cited by examiner

*Primary Examiner* — William R Harp

(57) ABSTRACT

Disclosed is a detector for detecting a product flow on a conveyor, including a base, to be fixed at a side of the conveyor, a pendulum, fixed to the based with a rotation to an axis, the pendulum rotating when products are pushed against it, a sensor, for detecting the position of the pendulum. The pendulum includes at an end thereof a contact unit having a flat plate shape, with a non-metallic surface for contacting the products.

10 Claims, 14 Drawing Sheets

PRODUCT DETECTOR

FIELD OF INVENTION

The current invention belongs to the domain of product conveying in an industrial processing line. The object of the present invention is a product detector.

BACKGROUND OF THE INVENTION

Products, like bottles or cans, are conveyed thanks to endless belt conveyors on which they stand. Conveyors have two opposed lateral vertical side walls between which products are moved. The speed of these conveyors is adjusted for controlling the overall line process and it is therefore necessary to detect the presence or absence of products in a predefined fixed area.

The result of such detection is then used as an input data for controlling the movement of the conveyors.

For example, DE102010000596 discloses a product detector. Such a metallic detector is mounted aside the conveyor, thanks to a base, fixed to the conveyor support. The detector has a pendulum, freely rotating around an axis parallel to the conveying direction. A longitudinal bar is mounted at the end of this pendulum, for contacting the products.

When products are absent, the longitudinal bar extends above the conveying surface. When products are present, they push the pendulum back behind the vertical wall of the conveyor, by acting on the longitudinal bar. The position of the pendulum is detected by a metal sensing means. Therefore, the longitudinal bar is to go through the vertical side frontier of the conveyor.

In a normal production state, the longitudinal metallic bar is constantly touching the product flow. This creates problems for sensitive products, for example cans, metallic bottles, or any other kind of products with no later surface treatment like labelling: the metallic longitudinal bar scratches the surface, can collect dusts and particles, later transferred to the products. Therefore, there is a need in the industry for a product detector creating no harm on the surface of the detected products.

Also, as the longitudinal bar has to go through the vertical side frontier of the conveyor, merely adding a soft protection around the longitudinal bar does not fit, because the required opening in this frontier would then be too big and allow circulation of undesirable particles like broken glass, etc.

Some contactless detectors have also been proposed, for detecting metallic cans or products. However, such detectors are not compatible with glass products, which cannot be detected with the same electromagnetic principle.

SUMMARY OF THE INVENTION

The invention aims at improving the state of the art as described here above, by proposing a product detector, compatible for both metallic and non metallic products, creating no harm on the external surface of the product, and/or compatible with small apertures in conveyors lateral walls.

In order to reach this, the invention proposes a detector with contact means having the shape of a flat piece with a gentle contact surface, preferably plastic based.

According to the invention, there is provided a detector for detecting a product flow on a conveyor, comprising a base, to be fixed at a side of said conveyor, a pendulum, fixed to the based with a rotation to an axis, said pendulum rotating when products are pushed against it, a sensor, for detecting the position of the pendulum.

This detector is characterized in that the pendulum comprises at an end thereof a contact means having a flat plate shape, with a non metallic surface for contacting the products.

Further features and advantages of the present invention will be better understood from the detailed description.

BRIEF DESCRIPTION OF THE DRAWINGS

A non-limiting illustration, with reference to the accompanying drawings, in which.

DETAILED DESCRIPTION

Figure 1:
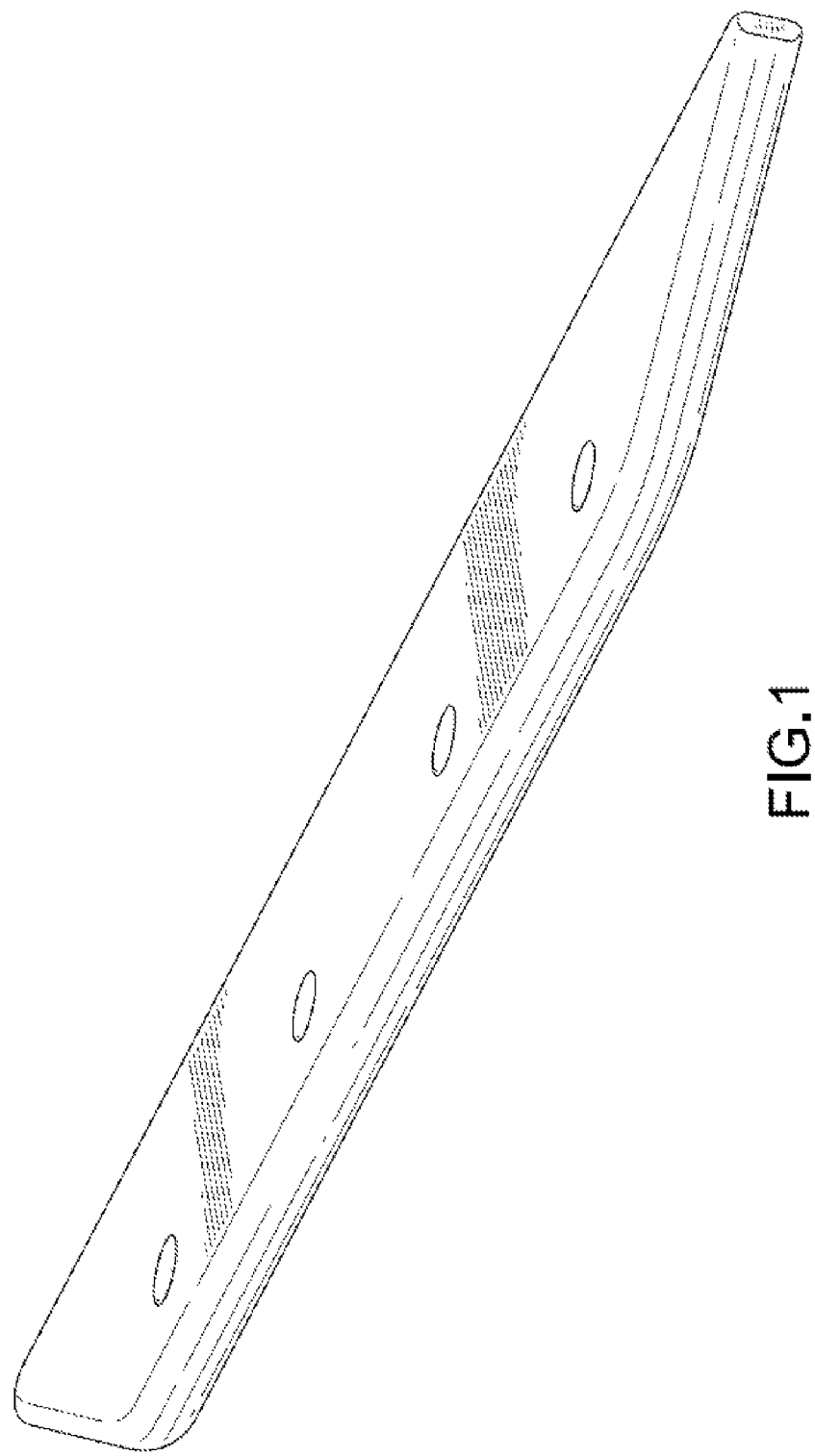
FIGS. 1 to 8 show a specific design of a plastic part, to be mounted at the end of the pendulum.

A first object of the present invention is a detector 1 for detecting a product flow on a conveyor 2, comprising a base 3, to be fixed at a side of said conveyor 2, a pendulum 4, fixed to the based 3 with a rotation to an axis 5, said pendulum 4 rotating when products are pushed against it, a sensor 6, for detecting the position of the pendulum 4.

The conveyor 2 is of a closed belt principle and the base 3 of the detector 1 is attached to a fixed infrastructure of the conveyor 2, on which the belt moves. The detector 1 works to detect the presence or absence of products in a certain fixed area. In order to do this, the detector 1 has a pendulum 4 rotating to an axis 5. The pendulum 4 mainly extends under this axis 5. Products push this pendulum 4 and displace it from its normal stable and balanced position. When no products are brought by the conveyor 2 in the detection zone, the position of the pendulum 4 is defined by its own weight, which creates a torque to this axis 5. The position of the pendulum 4 is therefore defined by, on the one side, the products themselves urged against the pendulum 4, and, on the other side, the weight of the pendulum 4. It should be noted that a force generating means like a spring can be envisaged to balance the product pressure.

The position of the pendulum 4 compared to the base 3 is detected by a sensor 6, preferably mounted on the base 3 itself. It is preferably based on a metal detection principle, and a signal is triggered when metal is detected by the sensor 6, which corresponds to a certain position of the pendulum 4: either retracted due to products, or protruding onto the conveying surface due to the absence of products.

The pendulum 4 is fixed to the base 3 outside of the product conveying surface, at its top end, at the level of the axis 5. The axis 5 is normally parallel to the conveying direction of the conveyor 2.

According to the invention, the pendulum 4 comprises at an end thereof a contact means 7 having a flat plate shape, with a non metallic surface for contacting the products, so that the detector 1 can be mounted on a conveyor 2 with a side window 8 of a reduced height. This non metallic surface is preferably made with plastic.

In fact, the bottom end of the pendulum 4 is to contact the products. Therefore, the pendulum 4 has a contact means 7 at said bottom end. It has a longitudinal edge, extending in the direction of the conveyor 2, so that a transversal force from the product flow is transformed in a pendulum 4 rotation. This contact means 7 preferably also has oblique opposed end portions, extending from the longitudinal edge, as best seen in the attached drawings. The contact means 7 presents such an oblique portion at both ends to avoid products being trapped between the longitudinal edge and the side wall 13 of the conveyor 2, or being not detected, in both direction of flow: normal flow from upstream to downstream, and opposite possible return flow from downstream to upstream, in case of accumulation situations, for example.

In the prior art, this contact means 7 is based on a bent stem, fixed at the bottom end of the pendulum 4. The invention differs from this prior art in that the contact means 7 has the shape of a flat and thin piece of plastic. The use of a gentle plastic material avoids scratches on the products, as well as noises. The outer surface of the contact means 7 is made of such a soft material. Also, the design as a flat plate provides both a good rigidity and a limited vertical dimensions: as will be described below in further detail, the contact means 7 is to cross the side wall 13 of the conveyor 2, and it is important to avoid corresponding passage apertures or window 8 of a high vertical dimension in said side wall 13.

This design leads to gentle contact with the product, good stiffness of the pendulum 4 and limited corresponding windows 8 in the side wall 13.

According to a possible additional feature, the pendulum 4 comprises a support structure 9 and, mounted at an end of said support structure 9, an elongated plastic part 10 for forming the contact means 7. Said plastic part 10 is for example made of Ultra High Molecular Weight Polyethylene. The support structure 9 may be made of metal, in order to be easily detected by a sensor 6.

The overall shape of the plastic part 10 is a flat piece of plastic, extending in a direction which is parallel to the axis 5 once installed, with tapered sides leading to opposed end points. This plastic part 10 forms at least the outer surface of the contact means 7, i.e. the surface which will contact the products. The plastic part 10 preferably also forms the top surface of the contact means 7, as best seen from FIG. 11, for example.

In some embodiments, the pendulum 4 forms a single piece with a support structure 9 integral with the plastic part 10. In some embodiments, the support structure 9 and the plastic part 10 are two different components.

According to another possible additional feature, the plastic part 10 and/or the support structure 9 and/or the pendulum 4 are/is obtained by additive manufacturing, also named 3D printing. As an alternative to injection molding, which could also be envisaged, the plastic part 10 can therefore be obtained by such an additive manufacturing process. The plastic part 10 is then assembled to the support structure 9. Said support structure 9 can also be obtained by such manufacturing processes. The whole pendulum 4 can also form one single piece, obtained with additive manufacturing.

According to another possible feature, the plastic part 10 has a cavity 11 for receiving the corresponding end of the support structure 9. This cavity 11 is for cooperating with the support structure 9 on which the plastic part 10 is mounted. In some specific embodiments, the cavity 11 and the corresponding end of the support structure 9 have complementary elongated shapes, preferably an overall elongated rectangle shape.

Figure 14:
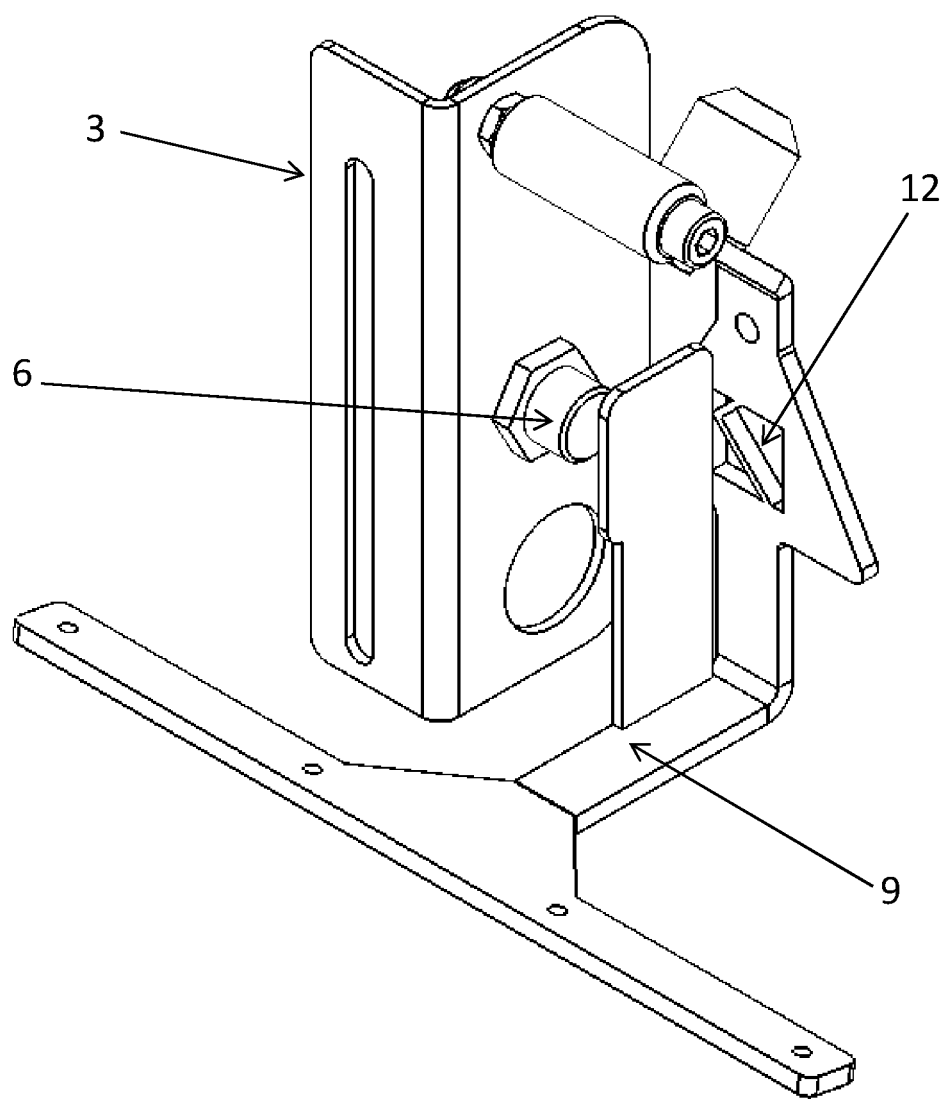
FIG. 14 shows the detector without this plastic part.

As best seen from FIG. 14, the support structure 9 has a bottom end of a rectangular longitudinal shape, extending parallel to the axis 5. Angled portions can be implemented to link this longitudinal rectangle to the central arm of the support structure 9. The pendulum 4 is so designed that the support structure 9 and the plastic part 10 have complementary and cooperating geometries: the cavity 11 at the bottom of the plastic part 10 corresponds to and fits the end of the support structure 9, especially the longitudinal rectangle. The end of the support structure 9 fits the cavity 11, which contributes to a good positioning.

The plastic part 10 may be fixed to the support structure 9 in a detachable way. In other embodiments, the plastic part 10 cannot be detached from the support structure 9, for example when overmoulding, gluing, welding, or even a locked snap fitting is used.

Therefore, in some preferred embodiments, the plastic part 10 is detachably mounted on the support structure 9. The plastic part 10 can then be changed if necessary, for example adapted to the products treated, removed once weared, dirty, or broken, etc.

In some possible embodiments, the plastic part 10 is screw mounted to the end of the support structure 9. This can be seen for example in FIGS. 11 to 14. Snap fitting is also a possible embodiment of a removable fixation of the plastic part 10 on the support structure 9.

Also, in some possible embodiments, the support structure 9 has openings 12 contributing to the balance of the pendulum 4 for it to be urged against the products. As already explained, at least the weight of the pendulum brings its contact means 7 above the conveying surface of the conveyor 2. Therefore, this weight is to be adjusted in order to guarantee a proper return of the contact means 7 in this configuration, but also to avoid an excessive urging of the pendulum 4 on the products or a too fast return movement, which would then tend to shock the products.

The design of the support structure 9 has openings 12, preferably at the level of the arm between the contact means 7 and the rotation axis 5.

In the embodiment shown in the attached drawings, the detector 1 is to be fixed at the lateral side of a conveyor 2, at its fixed infrastructure. Products are standing on the top surface of this conveyor 2, and moved by it. The conveyor 2 has a side wall 13 for defining a frontier for the flow of products. The conveyor 2 is normally of a closed loop design, and has a fixed infrastructure on which a motor is mounted for driving said belt.

The detector 1 has a base 3 for it to be fixed to the infrastructure of the conveyor 2. The detector 1 also has a pendulum 4, freely rotating around an axis 5. This axis 5 is normally parallel to the direction of the conveyor 2.

Figure 11:
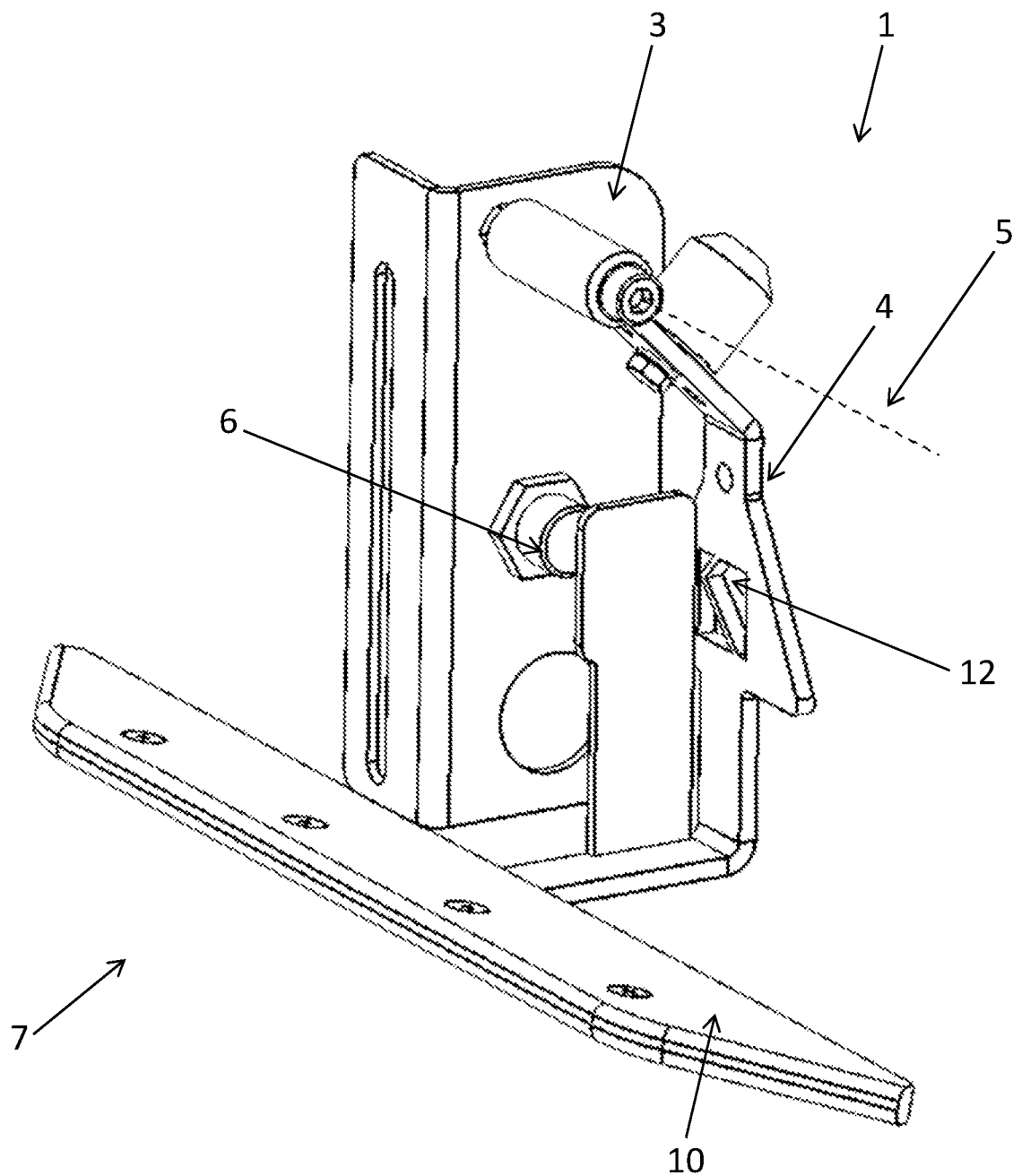
FIG. 11 is a view of a product detector according to the invention.
Figure 12:
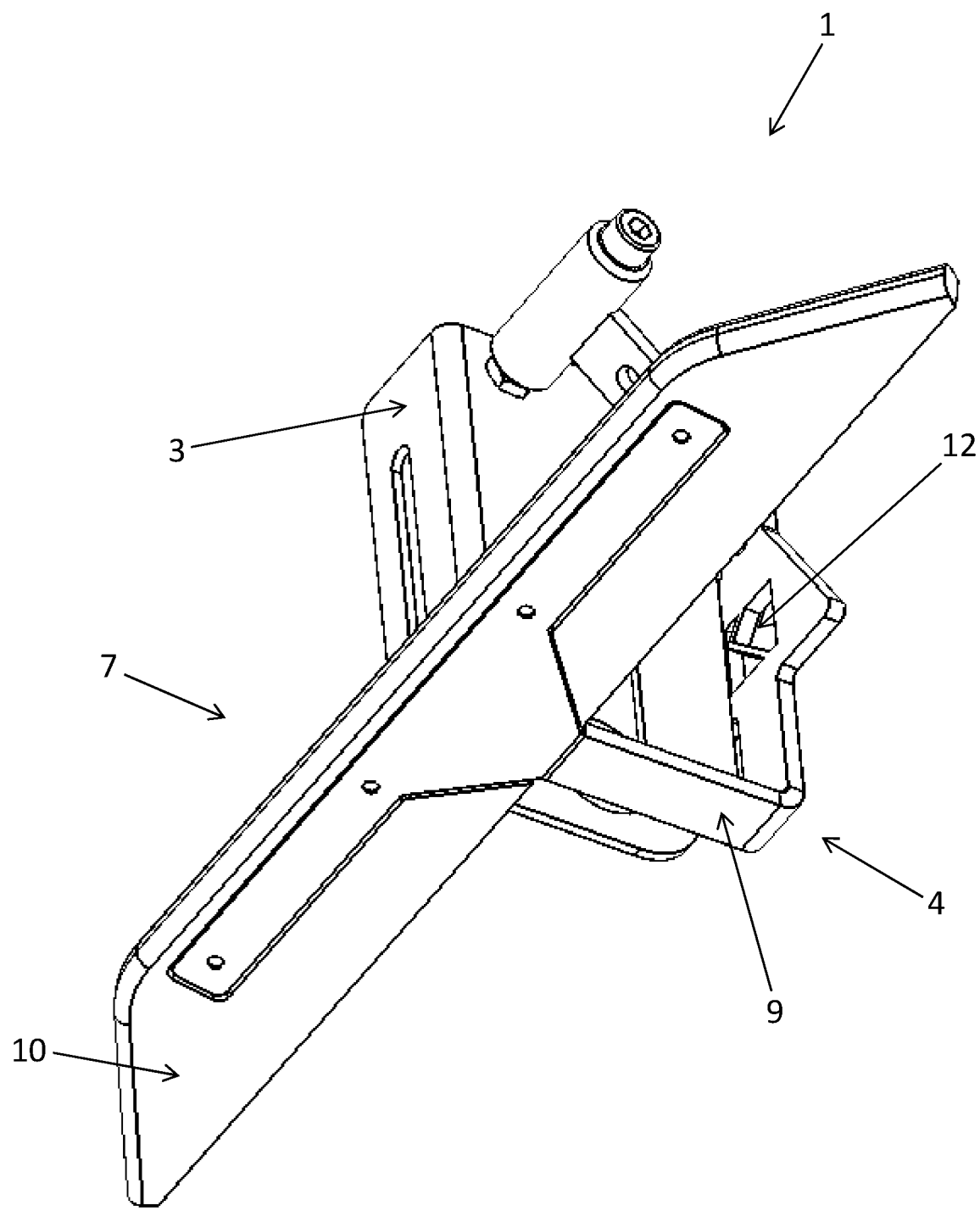
FIG. 12 is a bottom view of the same product detector.
Figure 13:
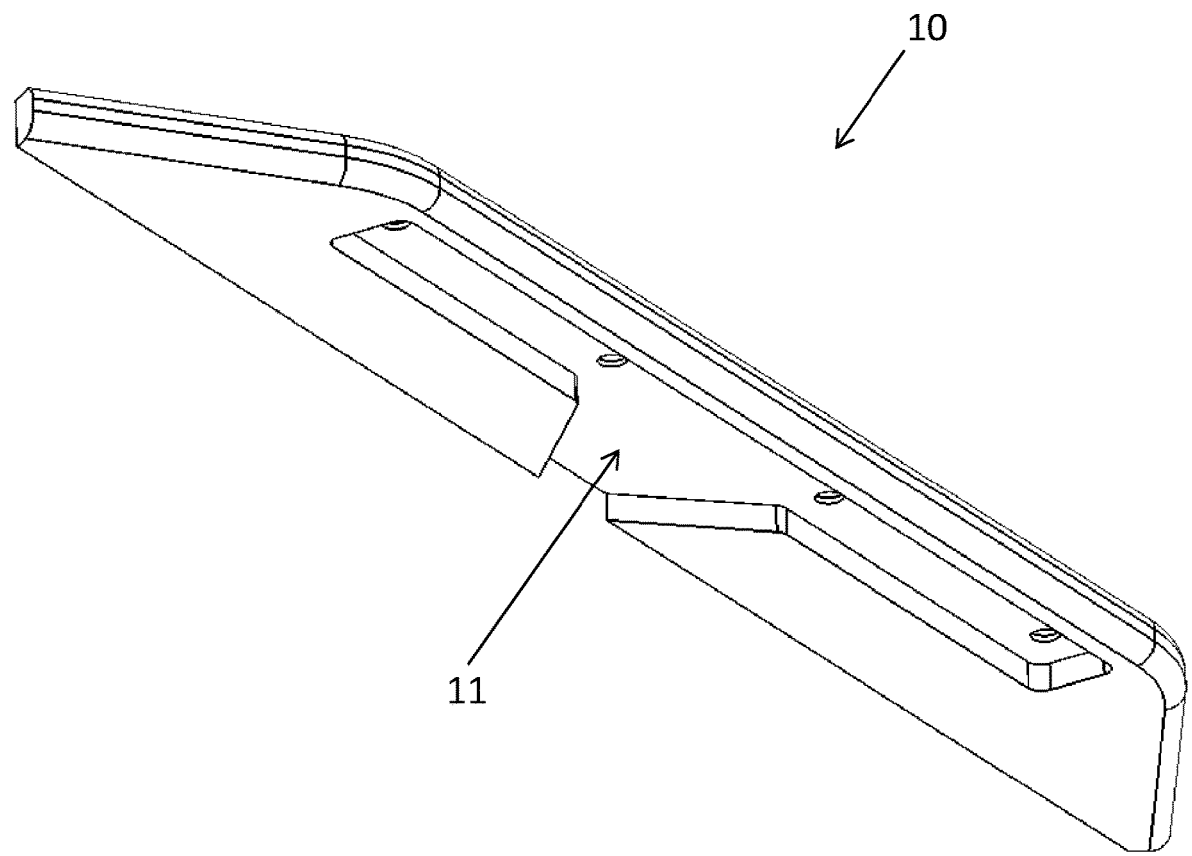
FIG. 13 focuses on the added plastic part, creating the contact means.

FIG. 11 shows that the base 3 has an axle or shaft, extending in a cantilever fashion in a horizontal direction. The pendulum 4 comprises a complementary hollow tube portion, or sleeve, to be mounted on said axle. A sensor 6 is also mounted in the base 3 and detects a tab of the pendulum 4, see FIG. 11.

It is to be understood that the rotation axis 5 is located in the top zone of the pendulum 4, so that the pendulum 4 can tilt to said axis 5 with its gravity center being under said axis 5. At the opposite bottom end, the pendulum 4 has a contact means 7, for touching the products 2 conveyed by the conveyor 2. This contact means 7 is at the end of the pendulum 4 and carries the surface on which products act.

Figure 15:
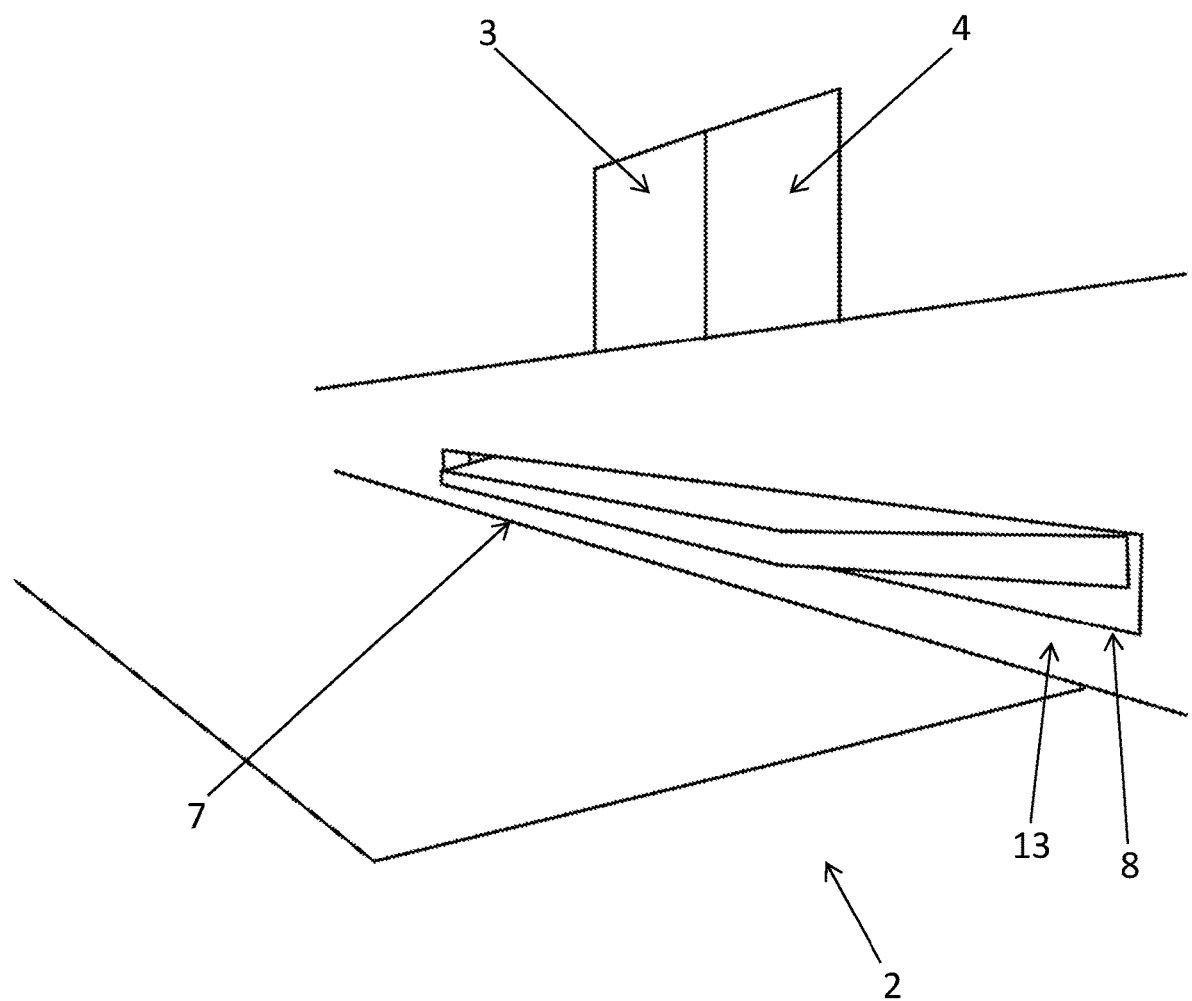
FIG. 15 schematically shows a conveyor side wall and a contact means go through it.

When products 2 are onto the conveyor 2, they act on the pendulum 4 and have it rotating around its axis 5 to reach a retracted position. This means that the end portion of the contact means 7 is pushed by the products to arrive approximately flush to the side wall 13. The pendulum 4 is in a retracted position. When products are absent or at least far from said side wall 13, the pendulum 4 has a different angular position to the axis 5 and the contact means 7 slightly extends after the side wall 13, as best seen from FIG. 15. The pendulum 4 is normally urged against the products due to its own weight.

Therefore, the contact means 7 is to cross the frontier defined by the side wall 13. As best seen from FIG. 15, the side wall 13 has a window 8 through which the contact means 7 can pass. The window 8 has a size corresponding to the size of the contact means 7 and is therefore of a reduced vertical height, extending in a horizontal direction parallel to the conveyor 2 plane.

In order to avoid damages on the surfaces of the products, the contact means 7 has an outer surface made of plastic. Preferably, as seen for example on FIG. 11, the contact means 7 has, from a top view, a basic rectangular shape, reducing to two points at opposed ends thereof. The resulting oblique contour avoids creating an abutment for the downstreaming or upstreaming product flow.

The contact means 7 has the overall form of a blade, that is to say a portion with a reduced height compared to its base surface. This blade can therefore move through a small window 8 in the side wall 13.

Products come in contact with the contact means 7 at the level of a portion of its perimeter. The contact means 7 is made of plastic at least in this portion.

Preferably, the pendulum 4 has a plastic part 10 at the end thereof, for forming the contact means 7. The plastic part 10 extends essentially parallel to the axis 5, and forms the contact means 7.

Figure 2:
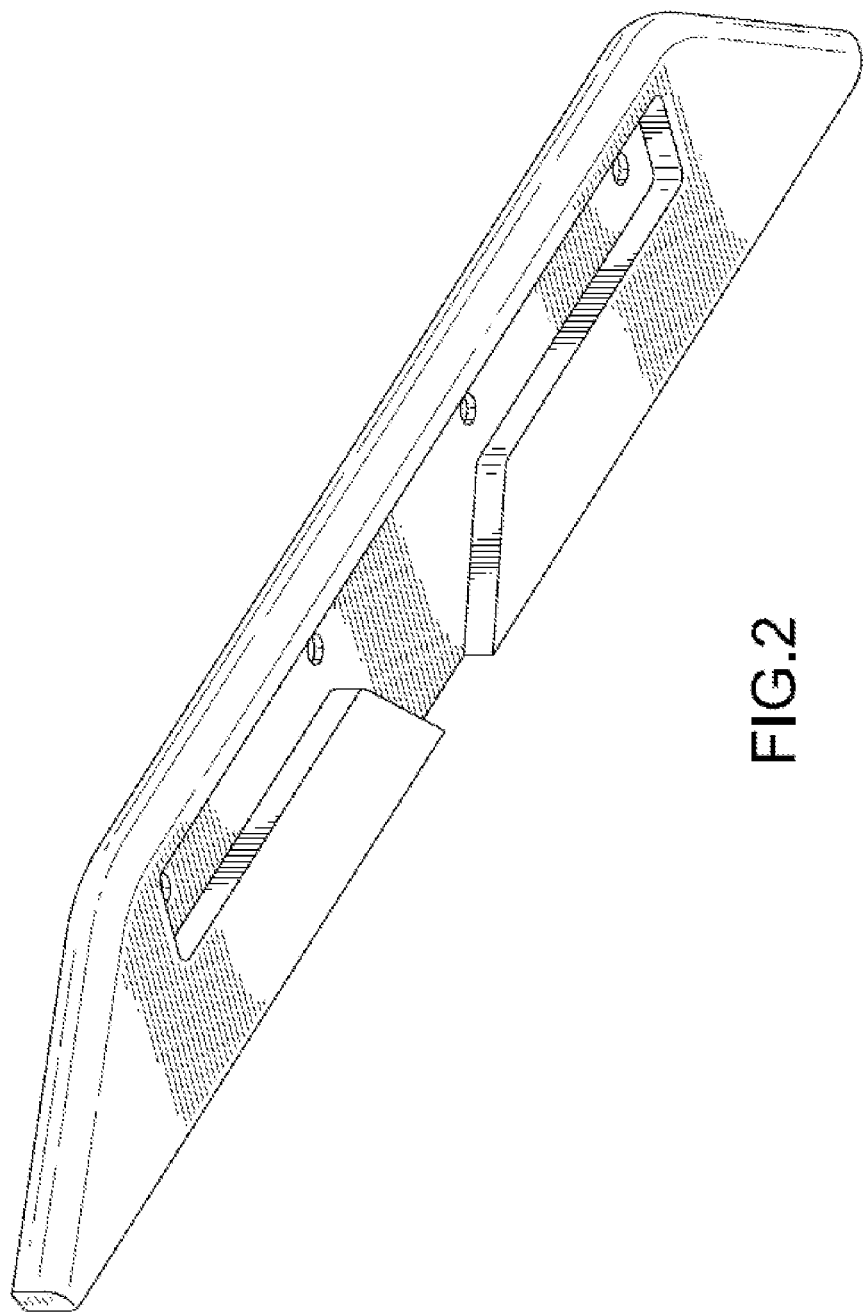
Figure 3:
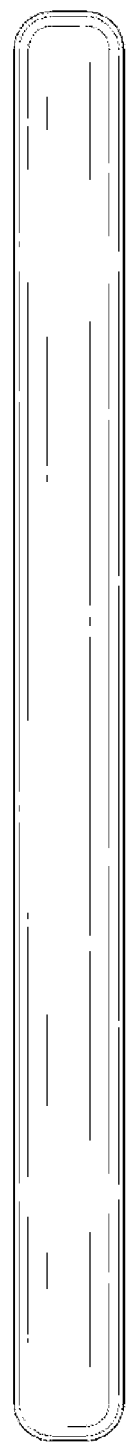

The plastic part 10 is of a reduced height and extends as a flat piece. The plastic part 10 is mounted on a support structure 9 of the pendulum 4, as best seen on FIG. 2. This support structure 9 can be metallic, for ease of detection by an electromagnetic sensor 6. This support structure 9 ends with a longitudinal rectangular shape. The plastic part 10 surrounds this rectangular shape, at least partly. As seen on FIG. 2, the bottom of the rectangular end of the support structure 9 can be free and uncovered by the plastic part 10. At least the plastic part 10 is between the rectangular end of the support structure 9 and the products. The plastic part 10 preferably also completely covers the top of the end of the support structure 9.

Preferably, the end of the support structure 9 and the plastic part 10 have complementary shapes: the plastic part 10 has a bottom cavity 11 in which the end of the support structure 9 can be received. The cavity 11 and the corresponding portion of the support structure 9 have complementary geometries, so that the plastic part 10 can have a stable position once fixed to the support structure 9. This geometry comprises a rectangle.

The pendulum 4 therefore is made of two different materials: the support structure 9 is made of metal, and the plastic part 10 is made of rigid but soft plastic. The edge of the contact means 7 is therefore gentle and does not harm the surface of the product. Also, as already said, the blade shape, having a limited height, also allows the window 8 to be of a limited height. A reduced window 8 avoids circulation of dangerous particles, small products, or even fallen down products.

The plastic part 10 is preferably made with ultra high molecular weight polyethylene, for its soft contact properties.

In some possible embodiments, the pendulum 4 is formed of a single piece, the plastic part 10 being integral with the support structure 9. The whole pendulum 4 is then made with a gentle material like plastic for avoiding harming the product surface for example by scratching.

In some specific embodiments, the plastic part 10 differs from the support structure 9, and is fixed to said support. The plastic part 10 can be definitely fixed, for example by overmoulding, gluing, locked snap fitting, etc. The plastic part 10 can also be removably fixed to the support structure 9 for example by screw mounting it, or by snap fitting it, etc. FIG. 1 shows a plastic part 10 fixed to the support structure 9 with four screws.

A detachable plastic part 10 makes it possible to change the plastic part 10 in case of excessive wear, for example.

Figure 4:
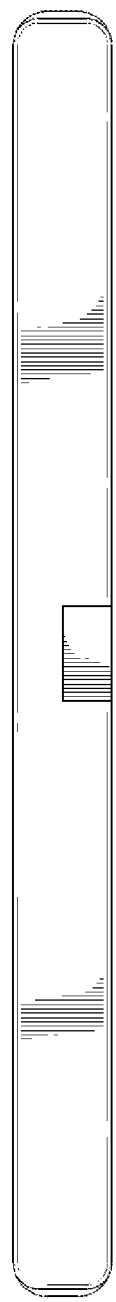
Figure 5:
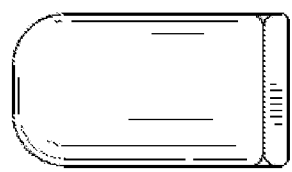
Figure 6:
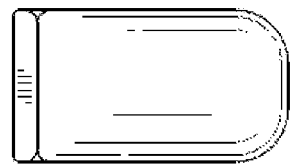
Figure 7:
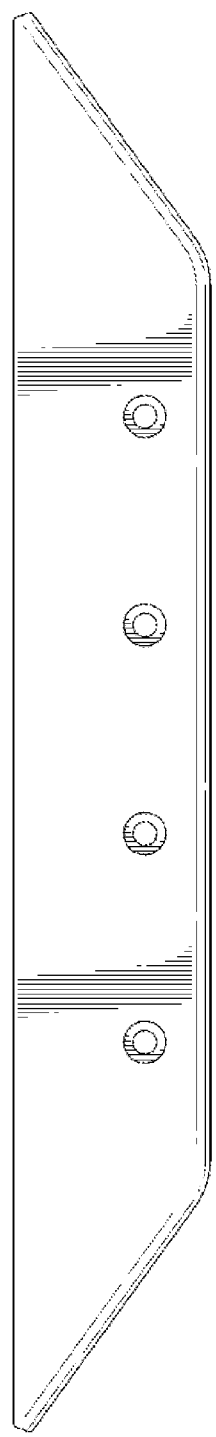
Figure 8:
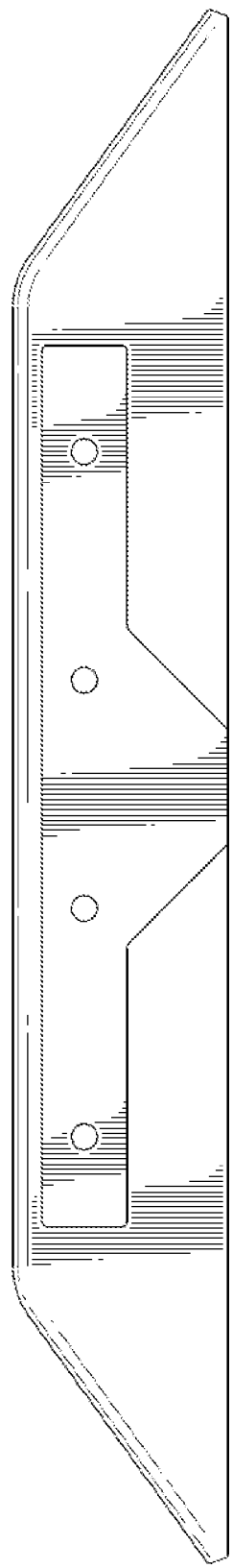
Figure 9:
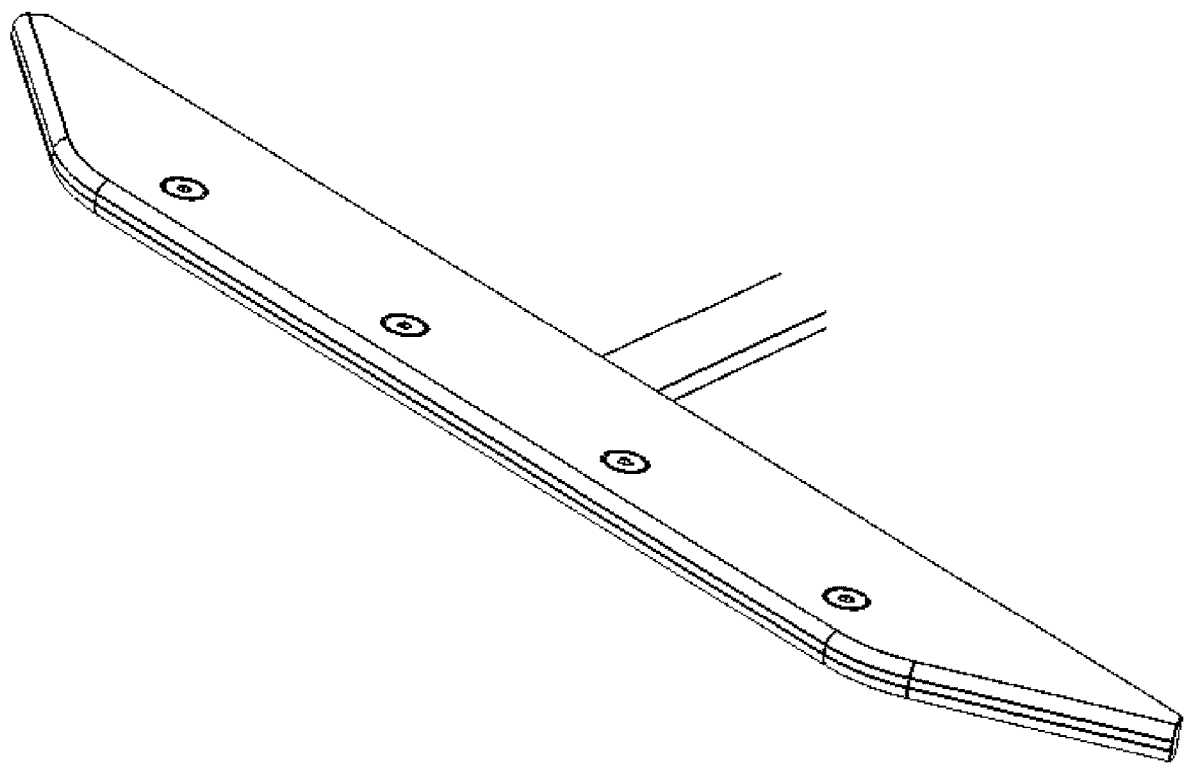
FIGS. 9 to 10 show a specific design of the end of the pendulum.
Figure 10:
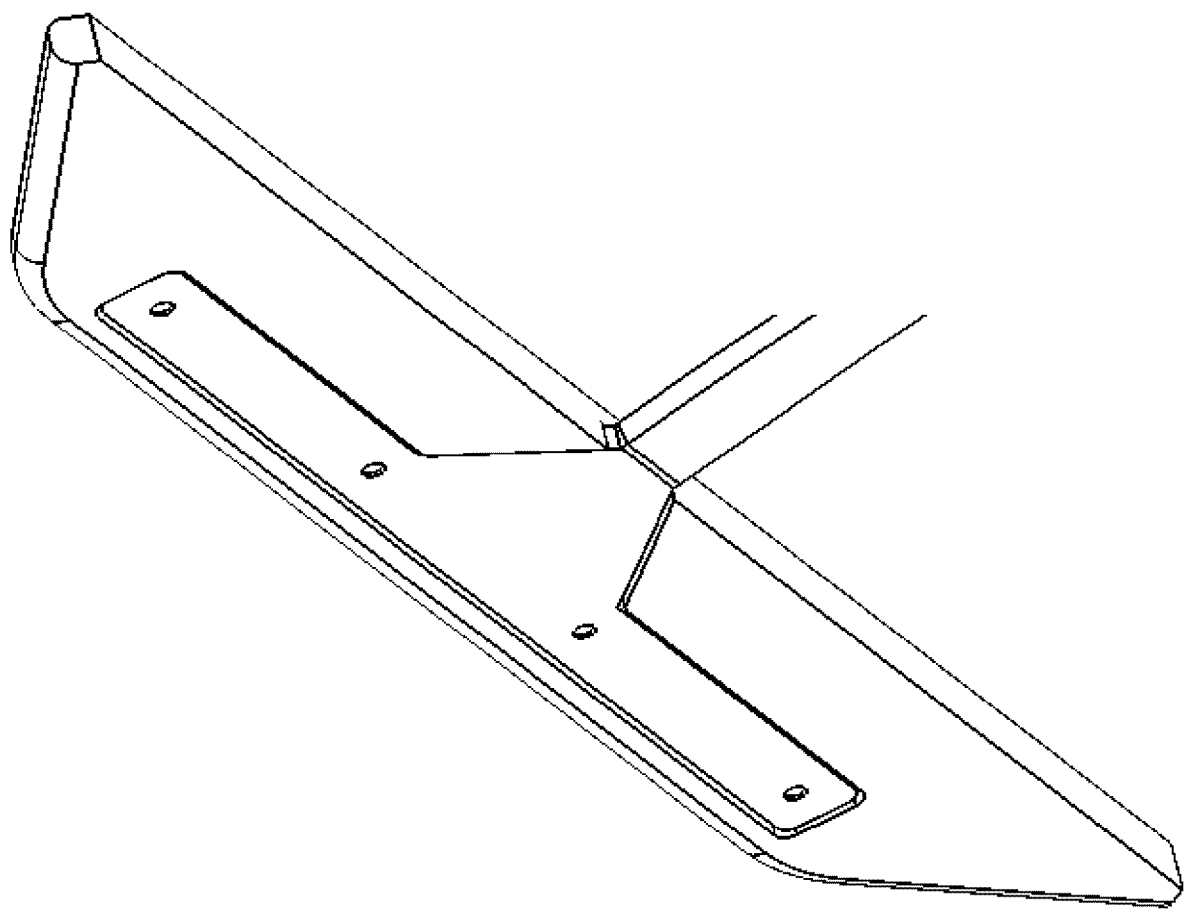

As best seen in FIG. 4, the support structure 9 has a bent lever: the support structure 9 is mounted to the base 3 at an end of said lever, and the contact means 7 is located at the other end. The weight of this lever contributes to bringing the contact means 7 onto the conveying surface, for detecting the presence of products. The lever has openings 12 sized to adjust the weight of the pendulum 4.

While specific embodiments of the invention have been described in detail, it will be appreciated by those skilled in the art that various modifications and alternatives to those details, in addition to those discussed above, could be developed in light of the overall teachings of the disclosure. Accordingly, the particular arrangements disclosed are meant to be illustrative only, and not limiting as to the scope of the invention which is to be given the full breadth of the claims appended in any and all equivalents thereof, including any combination of their features.

The invention claimed is:

1. Detector (1) for detecting a product flow on a conveyor (2), comprising
   a base (3), to be fixed at a side of said conveyor (2),
   a pendulum (4), fixed to the base (3) with a rotation to an axis (5), said pendulum (4) rotating when products are pushed against said pendulum (4),
   a sensor (6), for detecting the position of the pendulum (4)
   wherein the pendulum (4) comprises:
   at an end thereof, a contact means (7) having a flat plate shape, with a non metallic surface for contacting the products and an outer surface of the contact means (7) being made of an elongated plastic part (10), and
   a support structure (9) for supporting the contact means (7), said support structure (9) having a bottom end that extends parallel to the axis (5), and
   wherein the plastic part (10) has a flat plate shape and has formed therein a cavity (11) for receiving a corresponding end of the support structure (9),
   the cavity (11) and the corresponding end of the support structure (9) having complementary elongated shapes and the cavity (11) configured to position the end of the support structure parallel to elongated plastic part (10).

2. Detector (1) according to claim 1, wherein the plastic part (10) and/or the support structure (9) and/or the pendulum (4) are/is obtained by additive manufacturing.

3. Detector (1) according to claim 2, wherein the plastic part (10) is detachably mounted on the support structure (9).

4. Detector (1) according to claim 3, wherein the support structure (9) has openings (12) contributing to the balance of the pendulum (4) for the pendulum (4) to be urged against the products.

5. Detector (1) according to claim 2, wherein the support structure (9) has openings (12) contributing to the balance of the pendulum (4) for the pendulum (4) to be urged against the products.

6. Detector (1) according to claim 1, wherein the plastic part (10) is detachably mounted on the support structure (9).

7. Detector (1) according to claim 6, wherein the plastic part (10) is screw mounted to the end of the support structure (9).

8. Detector (1) according to claim 7, wherein the support structure (9) has openings (12) contributing to the balance of the pendulum (4) for the pendulum (4) to be urged against the products.

9. Detector (1) according to claim 6, wherein the support structure (9) has openings (12) contributing to the balance of the pendulum (4) for the pendulum (4) to be urged against the products.

10. Detector (1) according to claim 1, wherein the support structure (9) has openings (12) contributing to the balance of the pendulum (4) for the pendulum (4) to be urged against the products.

\* \* \* \* \*